(12) United States Patent
Fateh

(10) Patent No.: US 7,647,175 B2
(45) Date of Patent: Jan. 12, 2010

(54) DISCRETE INERTIAL DISPLAY NAVIGATION

(75) Inventor: Sina Fateh, Sunnyvale, CA (US)

(73) Assignee: Rembrandt Technologies, LP, Bala Cynwyd, PA (US)

( * ) Notice: Subject to any disclaimer, the term of this patent is extended or adjusted under 35 U.S.C. 154(b) by 389 days.

(21) Appl. No.: 11/223,434

(22) Filed: Sep. 9, 2005

(65) Prior Publication Data

US 2007/0061077 A1    Mar. 15, 2007

(51) Int. Cl.
*G09G 5/00* (2006.01)
(52) U.S. Cl. ................................. 701/220; 345/158
(58) Field of Classification Search .............. None
See application file for complete search history.

(56) References Cited

U.S. PATENT DOCUMENTS

| | | | |
|---|---|---|---|
| 1,374,857 A | 4/1921 | Linebarger |
| 2,209,255 A | 7/1940 | Anderson et al. |
| 2,788,654 A | 4/1957 | Wiancko et al. |
| 3,350,916 A | 11/1967 | Bock |
| 3,433,075 A | 3/1969 | Sutherland |
| 3,877,411 A | 4/1975 | MacDonald et al. |
| 4,209,255 A | 6/1980 | Heynau et al. |
| 4,227,209 A | 10/1980 | Warner |
| 4,445,376 A | 5/1984 | Merhav et al. |
| 4,548,485 A | 10/1985 | Dean |
| 4,565,999 A | 1/1986 | King et al. |
| 4,567,479 A | 1/1986 | Boyd |
| 4,603,582 A | 8/1986 | Middleton |
| 4,682,159 A | 7/1987 | Davison |
| 4,711,125 A | 12/1987 | Morrison |
| 4,712,426 A | 12/1987 | Peters |
| 4,821,572 A | 4/1989 | Hulsing, II |
| 4,839,838 A | 6/1989 | LaBiche et al. |
| 4,881,408 A | 11/1989 | Hulsing, II et al. |
| 4,906,106 A | 3/1990 | Kaufmann et al. |
| 4,935,883 A | 6/1990 | Hulsing, II |
| 5,003,300 A | 3/1991 | Wells |
| 5,109,282 A | 4/1992 | Peli |
| 5,125,046 A | 6/1992 | Siwoff |
| 5,151,722 A | 9/1992 | Massof et al. |
| 5,168,756 A | 12/1992 | Hulsing, II |
| 5,267,331 A | 11/1993 | Siwoff |
| 5,281,957 A | 1/1994 | Schoolman |
| 5,320,538 A | 6/1994 | Baum |
| 5,322,441 A | 6/1994 | Lewis et al. |

(Continued)

FOREIGN PATENT DOCUMENTS

EP    805 389    11/1997

(Continued)

OTHER PUBLICATIONS

International Search Report PCT/US2000/15210 dated Sep. 19, 2000.

(Continued)

*Primary Examiner*—Michael J. Zanelli
(74) *Attorney, Agent, or Firm*—Perkins Coie LLP

(57) ABSTRACT

A system and method for calculating velocity vectors from accelerations by establishing a predetermined acceleration threshold, and attributing a predetermined velocity vector to accelerations that cross the predetermined threshold. Preferably, the system and method are used in conjunction with hand-held displays.

24 Claims, 6 Drawing Sheets

U.S. PATENT DOCUMENTS

| | | |
|---|---|---|
| 5,325,123 A | 6/1994 | Bettinardi |
| 5,331,854 A | 7/1994 | Hulsing, II |
| 5,359,675 A | 10/1994 | Siwoff |
| 5,367,315 A | 11/1994 | Pan |
| 5,367,614 A | 11/1994 | Bisey |
| 5,373,857 A | 12/1994 | Travers et al. |
| 5,396,443 A | 3/1995 | Mese et al. |
| 5,422,653 A | 6/1995 | Maguire, Jr. |
| 5,442,734 A | 8/1995 | Murakami et al. |
| 5,447,068 A | 9/1995 | Tang |
| 5,450,596 A | 9/1995 | Felsenstein |
| 5,506,605 A | 4/1996 | Paley |
| 5,526,481 A | 6/1996 | Parks et al. |
| 5,563,632 A | 10/1996 | Roberts |
| 5,579,026 A | 11/1996 | Tabata et al. |
| 5,581,271 A | 12/1996 | Kraemer |
| 5,581,484 A | 12/1996 | Prince |
| 5,581,670 A | 12/1996 | Bier et al. |
| 5,590,062 A | 12/1996 | Nagamitsu et al. |
| 5,602,566 A | 2/1997 | Motosyuku et al. |
| 5,617,114 A | 4/1997 | Bier et al. |
| 5,661,632 A | 8/1997 | Register |
| 5,666,499 A | 9/1997 | Baudel et al. |
| 5,675,746 A | 10/1997 | Marshall |
| 5,685,651 A | 11/1997 | Hayman et al. |
| 5,686,940 A | 11/1997 | Kuga et al. |
| 5,686,942 A | 11/1997 | Ball |
| 5,689,619 A | 11/1997 | Smyth |
| 5,689,667 A | 11/1997 | Kurtenbach et al. |
| 5,734,421 A | 3/1998 | Maguire, Jr. |
| 5,742,264 A | 4/1998 | Inagaki et al. |
| 5,777,715 A | 7/1998 | Kruegle et al. |
| 5,790,769 A | 8/1998 | Buxton et al. |
| 5,844,544 A | 12/1998 | Kahn et al. |
| 5,844,824 A | 12/1998 | Newman et al. |
| 5,848,373 A | 12/1998 | DeLorme et al. |
| 5,910,797 A | 6/1999 | Beuk et al. |
| 5,918,981 A | 7/1999 | Ribi |
| 5,926,178 A | 7/1999 | Kurtenbach et al. |
| 5,955,667 A | 9/1999 | Fyfe et al. |
| 5,973,669 A | 10/1999 | Fitzmaurice et al. |
| 5,977,935 A | 11/1999 | Yasukawa et al. |
| 6,005,482 A | 12/1999 | Moran et al. |
| 6,009,210 A | 12/1999 | Kang |
| 6,018,705 A | 1/2000 | Gaudet et al. |
| 6,023,714 A | 2/2000 | Hill et al. |
| 6,072,467 A * | 6/2000 | Walker ................... 345/157 |
| 6,084,556 A | 7/2000 | Zwern |
| 6,112,099 A | 8/2000 | Ketola |
| 6,115,025 A | 9/2000 | Buxton et al. |
| 6,115,028 A | 9/2000 | Balakrishnan et al. |
| 6,118,427 A | 9/2000 | Buxton et al. |
| 6,122,340 A | 9/2000 | Darley et al. |
| 6,148,271 A | 11/2000 | Marinelli |
| 6,151,563 A | 11/2000 | Marinelli |
| 6,154,196 A | 11/2000 | Fleck et al. |
| 6,154,214 A | 11/2000 | Uyehara et al. |
| 6,176,197 B1 | 1/2001 | Thompson |
| 6,178,403 B1 | 1/2001 | Detlef |
| 6,184,847 B1 | 2/2001 | Fateh et al. |
| 6,201,554 B1 | 3/2001 | Lands |
| 6,249,274 B1 | 6/2001 | Svancarek et al. |
| 6,285,757 B1 | 9/2001 | Carroll et al. |
| 6,288,704 B1 | 9/2001 | Flack et al. |
| 6,300,947 B1 | 10/2001 | Kanevsky |
| 6,357,147 B1 | 3/2002 | Darley et al. |
| 6,362,839 B1 | 3/2002 | Hamilton et al. |
| 6,466,198 B1 | 10/2002 | Feinstein |
| 6,536,139 B2 | 3/2003 | Darley et al. |
| 6,573,883 B1 | 6/2003 | Bartlett |
| 6,675,204 B2 | 1/2004 | De Boor et al. |
| 6,690,358 B2 * | 2/2004 | Kaplan ................... 345/158 |
| 6,834,249 B2 * | 12/2004 | Orchard .................. 702/141 |
| 6,847,351 B2 * | 1/2005 | Noguera ................. 345/158 |
| 6,854,883 B2 | 2/2005 | Rund et al. |
| 6,856,327 B2 | 2/2005 | Choi et al. |
| 7,176,887 B2 * | 2/2007 | Marvit et al. ............ 345/156 |
| 7,184,025 B2 | 2/2007 | Williams et al. |
| 7,200,517 B2 | 4/2007 | Darley et al. |
| 7,301,528 B2 * | 11/2007 | Marvit et al. ............ 345/156 |
| 7,365,734 B2 | 4/2008 | Fateh et al. |
| 2002/0068556 A1 * | 6/2002 | Brown .................... 455/420 |
| 2002/0109673 A1 | 8/2002 | Valet et al. |
| 2002/0152645 A1 | 10/2002 | Darley et al. |
| 2003/0127416 A1 | 7/2003 | Salazar-Leal |
| 2003/0143450 A1 | 7/2003 | Ozeki et al. |
| 2004/0049574 A1 | 3/2004 | Watson et al. |
| 2004/0222976 A1 | 11/2004 | Muresan et al. |
| 2004/0257259 A1 | 12/2004 | Jindal |
| 2005/0177335 A1 | 8/2005 | Crisco et al. |
| 2006/0020421 A1 | 1/2006 | Darley et al. |
| 2006/0061550 A1 | 3/2006 | Fateh et al. |
| 2006/0061551 A1 | 3/2006 | Fateh et al. |
| 2006/0279542 A1 | 12/2006 | Flack et al. |
| 2007/0057911 A1 | 3/2007 | Fateh et al. |
| 2007/0061105 A1 | 3/2007 | Darley et al. |
| 2007/0203665 A1 | 8/2007 | Darley et al. |
| 2007/0208531 A1 | 9/2007 | Darley et al. |

FOREIGN PATENT DOCUMENTS

| | | |
|---|---|---|
| EP | 0825514 | 10/2003 |
| JP | 19900090460 | 12/1991 |
| JP | 19920078403 | 9/1993 |
| JP | 19930113166 | 11/1994 |
| JP | 19940089723 | 11/1995 |
| WO | WO-9932960 | 7/1999 |
| WO | WO 2005/109215 A2 * | 11/2005 |

OTHER PUBLICATIONS

International Search Report PCT/US1999/21235 dated Feb. 2, 2000.

Fitzmaurice, G.W. "Situated Information Spaces and Spatially Aware Palmtop", Communications of the Association for Computing Machinery, U.S. Association for Computing Machinery, New York, 36(7):39-49 (1993).

Flyer, "Virtual Reality Products that Work as Hard as You Do", General Reality Company, Mar. 1995, (5 pages).

Flyer, "Why Mouse Dual Input Adapters", P.I. Engineering, 1995, three pages.

Flyer, "Introducing HeadMaster Plus TM the Mouse and Keyboard Alternative for Personal Computers", Prentke Romich Company, Mar. 1995 (One page).

Flyer, "Ultra-Small Angular Velocity Sensor with Murata's Unique Triangular Prism Vibrating Unit", Gyrostar, Murata Mfg. Co., Ltd., Aug. 29, 1995 (2 pages).

Flyer, "1995 Master Source-Book", Industrial Computer Source, 1995 (2 pages).

Flyer, "Dragon Dictate The Premier PC Dictation Program", Dragon Systems, Inc., Dec. 1994 (4 pages).

Flyer, "MGA Power Family", Matrox Graphics Inc., Nov. 1995 (2 pages).

Flyer, "Talk to you PC JustVoice: Professional Speech Recognition for Windows", Integrated Wave Technologies, Inc., Nov. 1995 (3 pages).

Flyer "Magic Deluxe TM", Microsystems Software, Inc., Mar. 1995 (2 pages).

Flyer, "Magnum GT Graphics & Text Screen Enlarger", Artic Technologies, Jan. 1, 1995 (one page).

Flyer, "Computer Magnification Systems", TeleSensory, 1995 (4 pages).

Article entitled, "Compensating lags in Head-Coupled Displays Using Head Position Prediction and Image Deflection", Journal of Aircraft, vol. 29, No. 6, Nov.-Dec. 1992, by Richard H.Y. So and Michael J. Griffin (pp. 1064-to 1068).

Article entitled, "Improving Static and Dynamic Registration in an Optical See-through HMD", by Ronald Azuma and Gary Bishop, Computer Graphics Proceedings Annual Conference Series, 1994, Jul. 24, 1994 (pp. 197 to 203).

Article entitled, "Priority Rendering with a Virtual Reality Address Recalculation Pipeline", Computer Graphics Proceedings, Annual Conference Series, 1994, (pp. 155 to 162).

Publications entitled, "Virtual Computer Monitor For Visually Imapaired Users", by Arthur L. Zwern, General Reality Company and Michael R. Clark, Apple Computer Corporation, Nov. 30, 1994. (9 pages).

Slides on, "Virtual Computer Display for Visually-Impaired Users", CyberEye TM, by General Reality, Nov. 30, 1994 (12 pages).

Flyer, Virtual Computer Monitor, General Reality Corporation, Mar. 1995, (1 page).

Flyer, "A Brighter Picture a Fuller Life—The Visionics Low Vision Enhancing", Visionics Corporation, Mar. 1995 (4 pages).

Flyer, "OPLELEC Independence Solutions for People with Low Vision", Optelec, 1993 (6 pages).

Flyer, "Magnify Your Screen and Your Possibilities", ZoomText, Mar. 1995, (one page).

Slides on, "Virtual Computer Display for Visually-Impaired Users", CyberEye TM, by General Reality Company, Aug. 28, 1995, pp. 1-12.

Slides, "Anta", poster paper, General Reality Company, Feb. 13, 1996 (12 pages).

Jun Rekimoto, "Tilting Operations For Small Screen Interfaces (Tech Notes)", (1996), UIST '96, p. 167.

Small, et al. "Design of Spatially Aware Graspable Displays", (1997), chi 97, p. 367.

C. Verplaetse, "Inertial proprioceptive devices: Self-motion-sensing toys and tools", (1996), IBM System Journal, vol. 35, p. 639 pg.

* cited by examiner

TOP VIEW

DISCRETE INERTIAL DISPLAY NAVIGATION

BACKGROUND

The computation of a navigation solution for an object at rest or in motion based on measurements of the changes in the inertia of the object is a well-established science. Instruments known as Inertial Measurement Units (IMU's) comprising sensors and computational functions have been developed for a wide variety of navigation tasks such as charting the course of a submarine below the surface of the water or guiding the trajectory of a missile in space. The task of an IMU is to measure the changes in acceleration experienced by the object from which a navigation solution or update can be calculated. Typically, the type of sensors that are used in an IMU are either a gyroscope or accelerometer, or both. The number of sensors depends upon the number of independent measurements that are desired for the specific computational process employed and the accuracy of the solution desired. The resulting accuracy of the navigation solution is highly dependent upon the sensitivity and accuracy of the sensors, the resolution of the data they provide to the computational process, and the speed and resolution of the computations themselves. The cost of an IMU for typical navigation purposes can range from a few thousand dollars to over a million dollars depending on the accuracy and other requirements of the navigation function.

Today, there are some low cost accelerometers have been produced for commercial markets that will measure a tilt which is due to changes in the direction of gravity. One example is a tilt sensor that can be built into a device to provide an automatic shut-off capability in case the device is tipped on its side. Another application of low accelerometers is in the automotive industry where an automobile's sudden deceleration can be detected and used to trigger the deployment of an air bag protective device during a collision. These low cost accelerometer sensors have been designed for applications that do not require a high degree of measurement accuracy as compared to accelerometers designed for navigation applications.

It would be desirable for certain commercial applications to employ both low cost sensors and low cost digitization and computational elements in order to be able to include inertial navigation capabilities.

Low cost navigation solutions based upon inexpensive sensors and computational elements are available. Incorporation of accelerometers, for example, is being incorporated into hand held computer displays. Examples of this type of display can be found, for example, in U.S. patent application Ser. No. 09/328,053, filed Jun. 8, 1999, which is incorporated herein by reference. In the '053 application, a hand held device displays a portion of a computer image, and a user scrolls this image by moving the hand held device in real space.

What is needed, therefore, is a way of making a viable inertial navigation capability using low cost accelerometers, while at the same time maintaining a practical level of navigation accuracy, complexity and cost.

SUMMARY OF THE INVENTION

The present invention seeks to solve the problem of navigation using low cost sensors that may have limited accuracy by providing a system of threshold navigation.

The present invention may also be used with more complex sensors as a way of streamlining computations that involve the use of these sensors in navigation.

In one embodiment of the present invention, an accelerometer sensor measures the acceleration of an object and the measurement is compared to a threshold level before a response is produced. If the accelerometer measurement is above the threshold, then the response is set to a standardized acceleration output that corresponds to the threshold and this standardized output is used in the navigation calculations. Since accelerometer sensors may measure both positive and negative accelerations, there may be, respectively, both positive and negative thresholds that result in positive and negative standardized outputs.

In a refinement of this embodiment, the accelerometer sensor measurement may be compared to multiple thresholds and one of several standardized outputs could be selected corresponding to the largest of the thresholds that the sensor's output reached or exceeded. This refinement enables the accelerometer sensor to ignore insignificantly small measurements that are smaller than the lowest threshold and also to output stable, reliable data at appropriate incremental steps corresponding to the magnitude of larger accelerometer sensor measurements.

A preferred embodiment includes combining measurement data from multiple sensors in the navigation calculations to determine the movement of an object, for example, in three dimensions. Individual measurement thresholds may be used for each sensor to determine what standardized output is to be used from each sensor in the navigation calculations. Measurements from multiple sensors may be combined to form a vector sum of the measurement data and the resulting vector sum may be compared to a threshold to determine the sensor data to be used in the navigation calculations.

In a preferred embodiment, threshold navigation is used to measure and compute the movements of an object within a limited volume of three-dimensional space. A specific example of this embodiment is the determination of movements of a device or appliance that is held in the hand or worn on the body of a user. The virtue of applying threshold navigation to a hand-held or body-worn object is that the range of potential movements of the user's body limits the volume of the three-dimensional space comprising the potential range of the object's motion, and also the duration of this movement is finite. Both of these restrictions can be used in setting the parameters of calculating threshold navigation.

In a further preferred embodiment, the threshold navigation has an off/on function that can deactivate the accelerometer measurements and, preferably, reset halt all navigation calculation process, which in a display screen version would have the effect of setting all movement on the display to zero.

In still another preferred embodiment, a process such as computations that estimate the error statistics of the sensor(s) can adjust the thresholds used for comparison to one or more accelerometer measurements.

In yet another preferred embodiment, the system automatically ignores certain changes in acceleration, preferably only for a finite duration, such as immediately after starting and stopping.

BRIEF DESCRIPTION OF THE DRAWINGS

FIG. 5 also shows an exaggerated view of how the acceleration can be mapped on the display screen.

DETAILED DESCRIPTION

One aspect of the invention endeavors to monitor the output from accelerometer sensors and compare this to threshold settings. Then, depending on whether the level of the accelerations measured are above the thresholds, choose between different predefined velocities. These predetermined velocities are then used instead of attempting to determine the actual velocity. When a predetermined velocity is selected, it can be stopped by an opposite acceleration (above a given threshold), or "upgraded" to a higher velocity if an acceleration is measured above a higher threshold. The first or lowest threshold has to be high enough to ignore sensor noise and unintentional movements, but low enough to allow the navigation system to respond to small intended movements.

In this aspect of the invention, an accelerometer sensor measures the acceleration of an object and the measurement is compared to a threshold level before it produces a response. If the accelerometer measurement is above the threshold, then the response is set to a standardized acceleration output that corresponds to the threshold and that standardized output is used in the navigation calculations. Since accelerometer sensors may measure both positive and negative accelerations, there may be both positive and negative thresholds that result in positive and negative standardized outputs, respectively.

Accelerometer sensors in a navigation system employing threshold navigation would produce no output for small accelerations and a standardized output for accelerations above a threshold. Thus, the navigation calculations for an object would ignore accelerations below a threshold, which are presumably caused by sensor noise or inconsequential variations in the sensor's output. Accelerations above a threshold would be converted to a standardized acceleration value, minimizing the navigation system's reliance on the absolute accuracy of the acceleration sensors. In most practical systems envisioned for threshold navigation, the meaningful movements of an object will be above the threshold and the duration of the movement will be of a finite duration. In a hand-held display, for example, if the threshold navigation system responds to any measured acceleration above the threshold there will be also, within a finite time, complimentary accelerations (i.e. negative accelerations or decelerations) in approximately the opposite direction. It should be noted that the value of the thresholds for positive and negative accelerations do not have to be equal. They may be set to different values depending on many factors including differences in sensor performance in the positive and negative directions or differences in the expected magnitude of meaningful accelerations that the object may experience. This is explained in greater detail in the following description of the figures.

Figure 1:
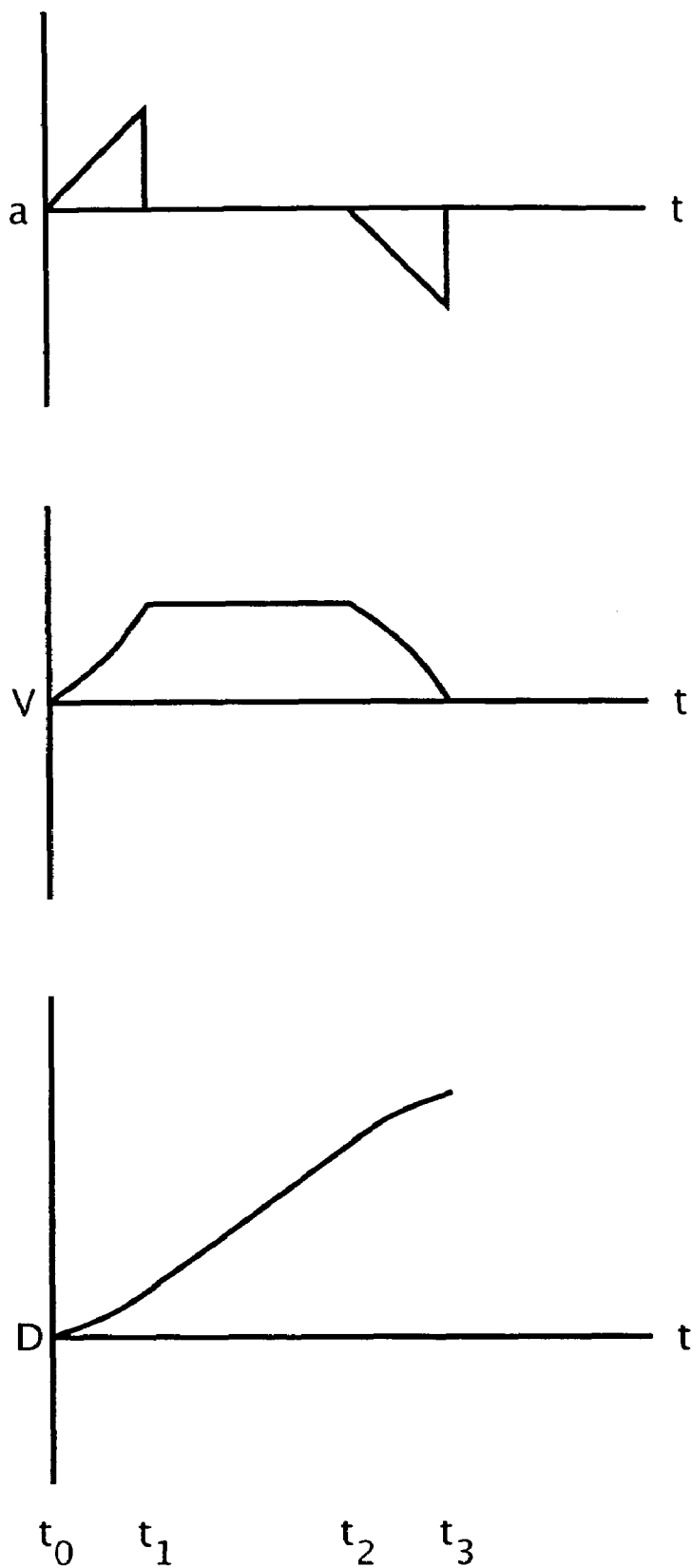
FIG. 1 graphically illustrates how a natural acceleration occurs, as well as the resulting velocity and net distance.
Figure 2:
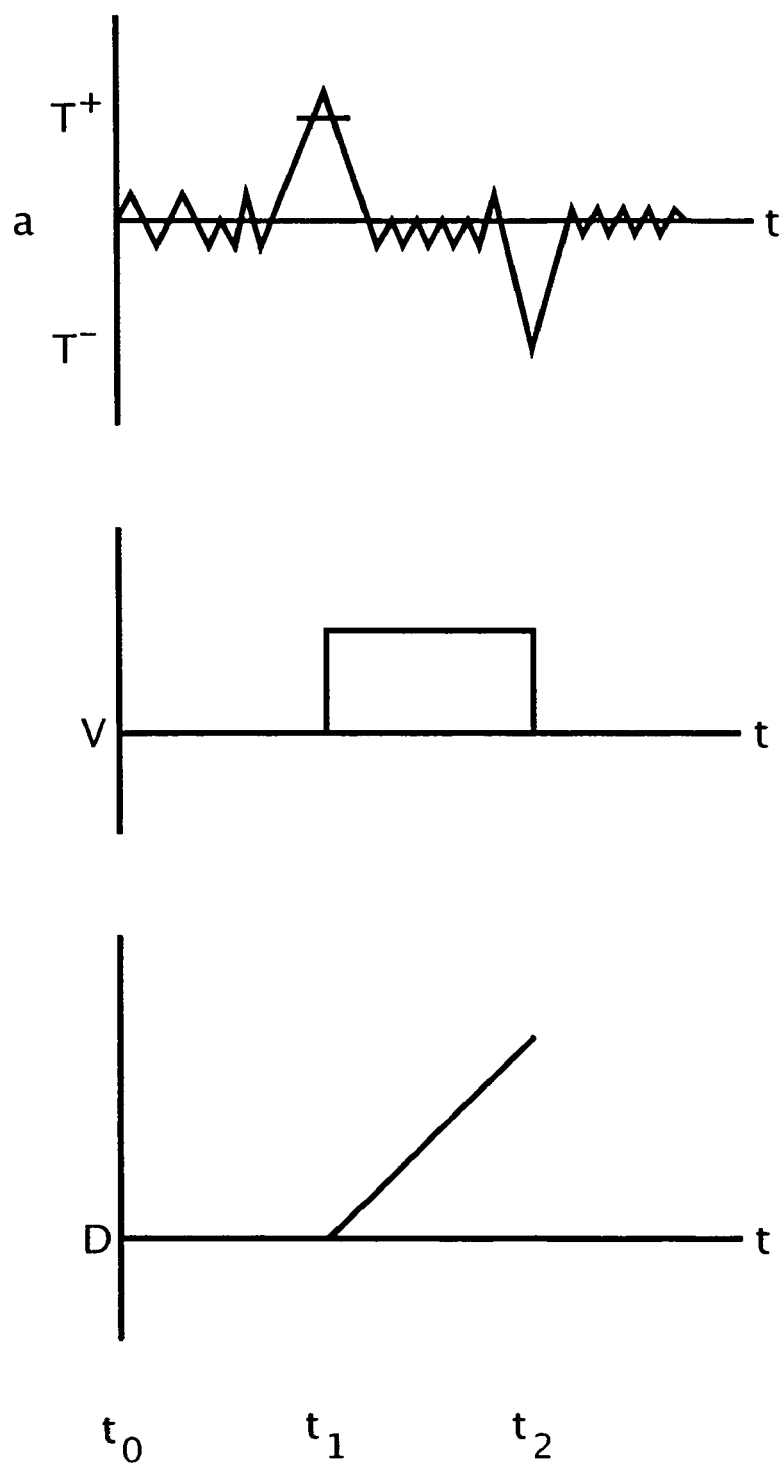
FIG. 2 graphically illustrates how a natural acceleration is not measured until it reaches a threshold level.
Figure 3:
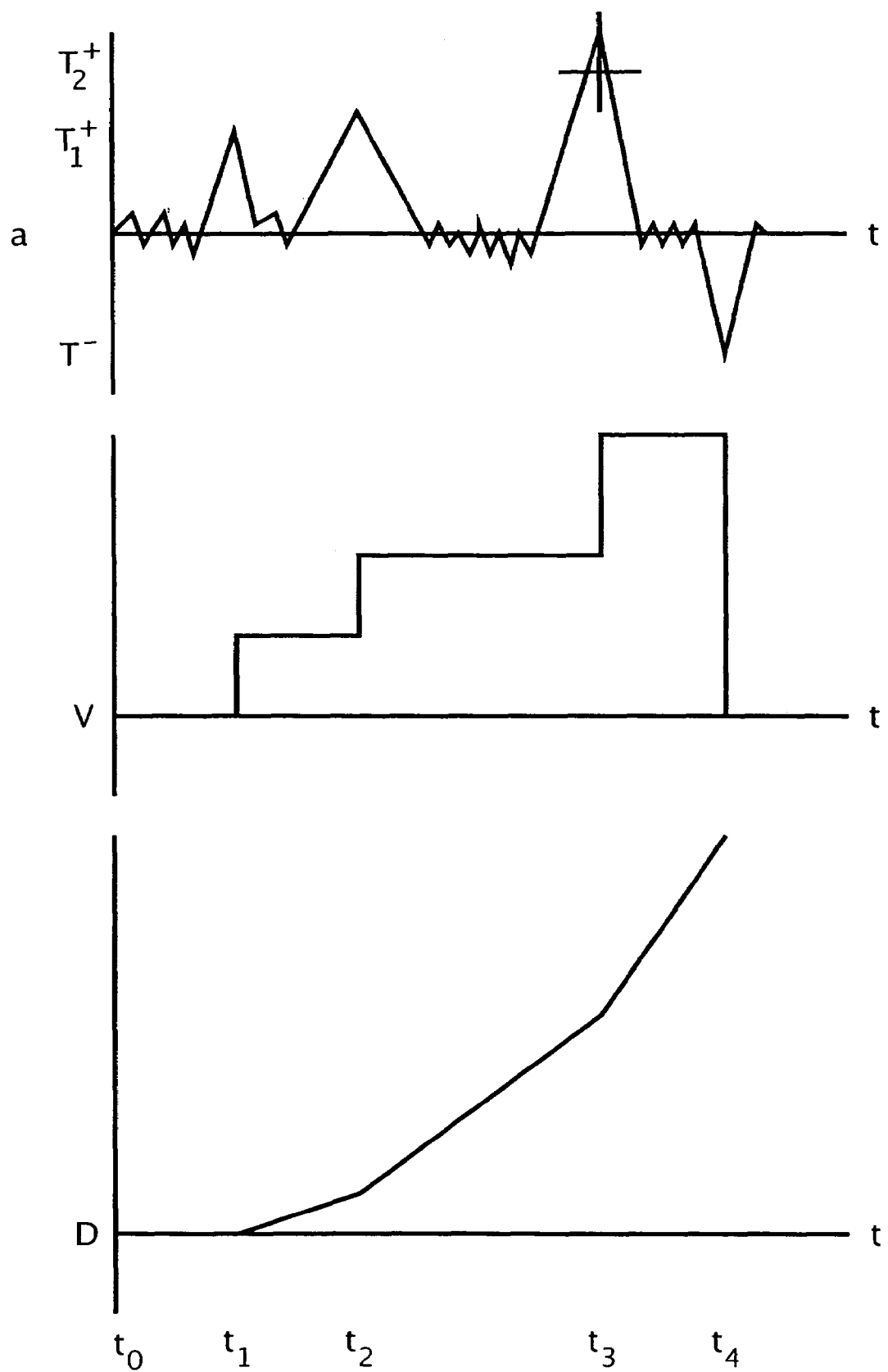
FIG. 3 graphically illustrates a natural acceleration traversing multiple positive and negative threshold acceleration levels.

FIGS. 1 through 3 show comparatively how threshold navigation works. All three figures trace a single movement and plot this movement on an acceleration a, velocity V, and distance D chart, all plotted versus time t. In FIG. 1 there is an example of real acceleration, starting at t0 and peaking at t1. In the corresponding velocity chart, this creates a geometrically increasing velocity vector ($V=^2/2$), which plateaus when the acceleration stops. Then, a corresponding negative velocity begins when, at t2, acceleration becomes negative. At t3 velocity has stopped. The total distance is also mapped.

FIG. 2 shows one method of how threshold navigation works. Minimal amounts of acceleration do not register on the velocity chart (and subsequently the distance chart). Only when an acceleration level crosses a certain threshold level, T+, is velocity triggered. In this case, the response velocity output is at a preset level. While, ideally, the velocity mimics what the natural velocity would be, it can in fact be set to any level. In FIG. 2, a slight transition period between zero velocity and the preset velocity is shown, mimicking the natural geometrically increasing and decreasing velocity characteristics. The velocity characteristics can be varied, or even eliminated, depending on user preference. A negative acceleration, which reaches a negative threshold level T−, ends the velocity vector, and subsequently stops further distance.

FIG. 3 shows a more complicated example of threshold navigation, where there are two positive threshold levels, which cause a corresponding increase in the velocity vector. Again, these can be set at any level, but a velocity vector which most reflects a natural velocity is preferred. Also, as mentioned above, a slight curve in the velocity graph increase and decrease represent an attempt to mimic natural velocity change, but this need not be present. In FIG. 3 there is only one negative acceleration threshold, which stops all further distance regardless at what level of velocity the system was at prior to this. This is a preferred embodiment, but obviously multiple negative threshold levels can easily be set to correspond to a step-wise decrease of the velocity. It is also recognized that negative accelerations often have a less dramatic peak than what is shown in FIGS. 2 and 3, and the system can be adjusted to accommodate this.

Figure 4:
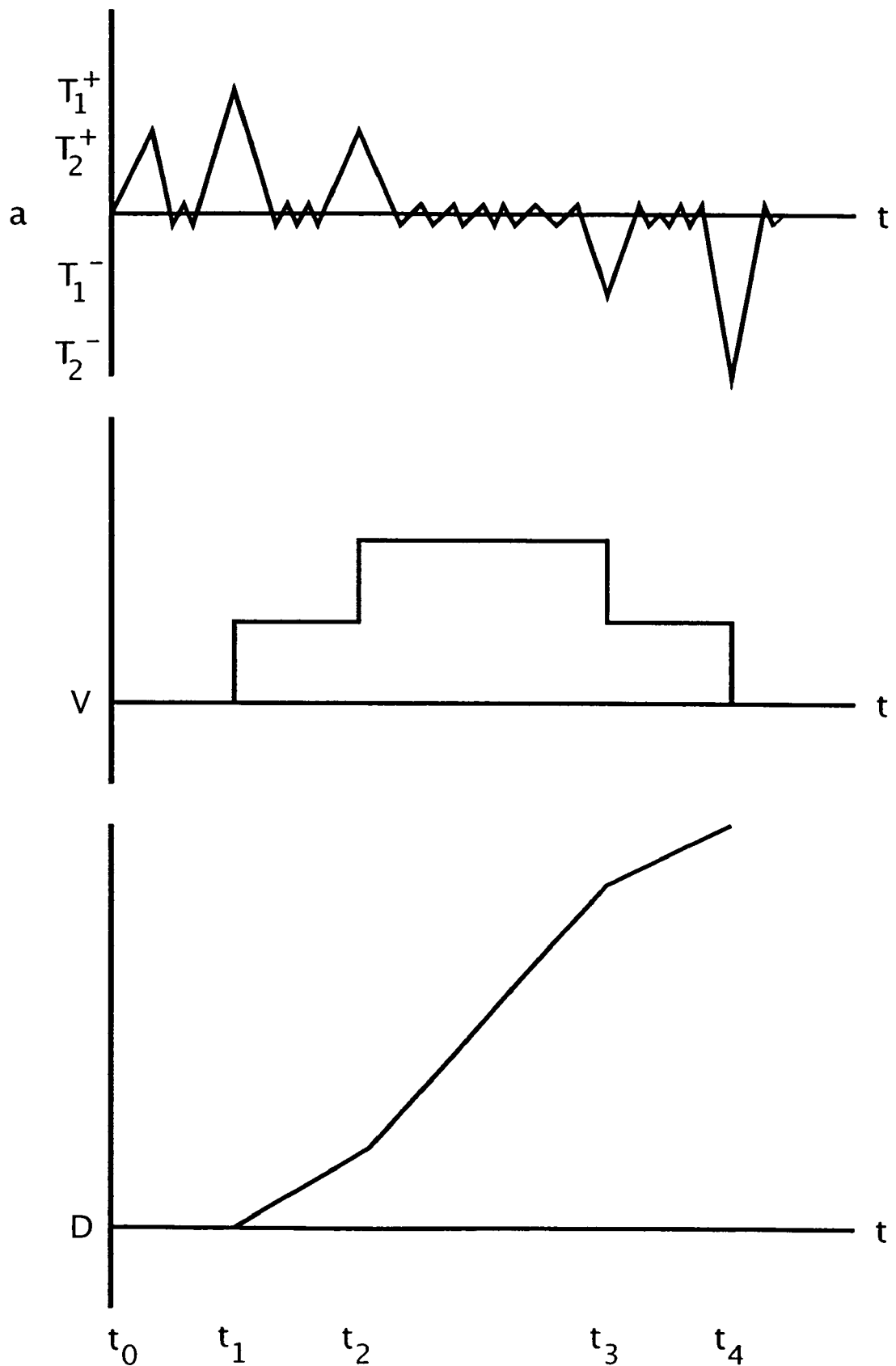
FIG. 4 graphically illustrates an embodiment where a second positive acceleration threshold can be lower than the first.

FIG. 4 illustrates yet another preferred embodiment where a second acceleration threshold level is lower than the initial threshold level. The result is that once the accelerometers measure an initial movement, subsequent movements are registered more easily. Notice that the second threshold level $T_2^+$ does not recognize an acceleration until the first threshold level $T_1^+$ is crossed. An effect of this embodiment is that system becomes more sensitive once it is activated. The resulting velocity increases shown in FIG. 4 is the same for both $T_1^+$ and $T_2^+$, but these velocities can just as easily produce a velocity that is less than or even greater than the velocity produced by crossing the first threshold. Optionally, the first threshold level is deactivated after it is initially crossed.

Also shown in FIG. 4 are the multiple negative threshold levels discussed above. One embodiment not shown is to have the greater negative threshold level, $T_2^-$ in this case, act as an absolute stop, while the lesser negative threshold still acts as an incremental deceleration. These negative increments would produce the benefit of having an incremental deceleration for smaller decelerations, while at the same time having an absolute stop for a drastic deceleration. If this threshold system were implemented, the spread between the incremental and absolute what is represented in FIG. 4.

Figure 5:
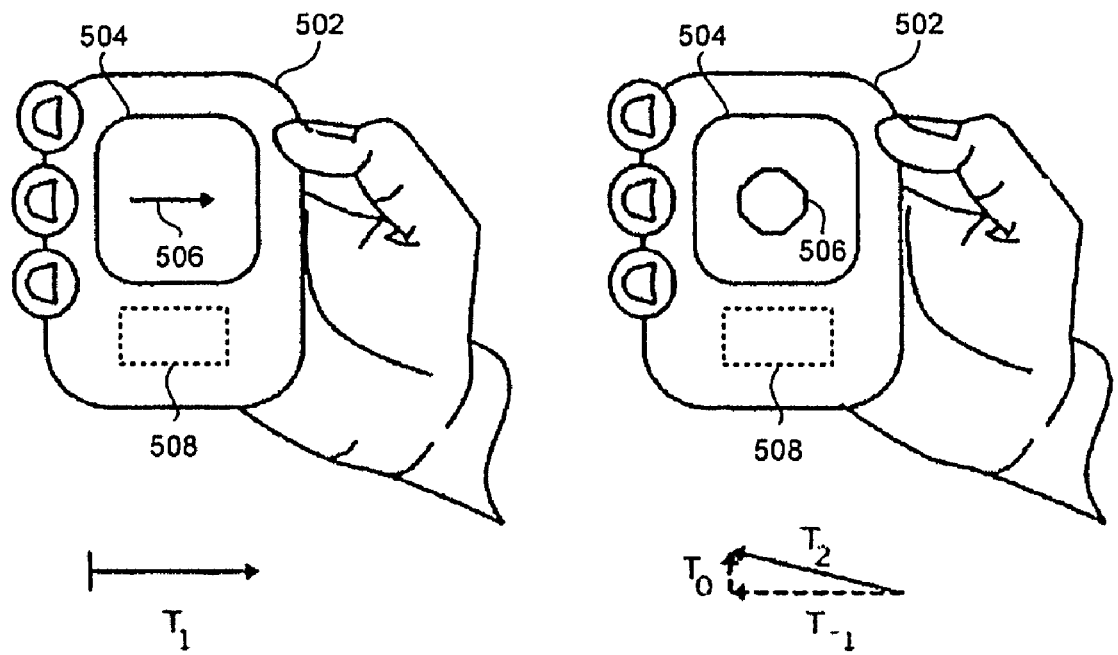
FIG. 5 depicts how one embodiment of the invention measures an acceleration in one direction, then measures the stop, even though it is not exactly equal and opposite.

FIG. 5 depicts the invention being used in a hand held device 102. The user first moves the display device to the right, with enough acceleration $T_1$ to trigger the threshold level. When the user wishes to stop, a negative acceleration should be greater than acceleration $T_2$ is produced. In this diagram, it is shown that the negative acceleration is not exactly equal and opposite to the forward velocity vector. However, the components of the negative acceleration, $T_0$ and $T_{-1}$, still bring the virtual movement on the display screen 504 to a halt. $T_{-1}$ is enough to cross the negative threshold, which does not have to be set equal to the $T_1$, threshold, while the slight upwards movement, $T_0$ is not registered as a movement as it is too small to cross the threshold level.

The actual response on the display screen 504, besides movement, can include a movement indicator 506, such as an arrow or stop sign, based on the accelerometer's readings. Preferably this indicator does not move with the rest of the screen content and only takes up a small portion of the display face.

It is preferred that measurement data be combined from multiple sensors 508 in the navigation calculations to determine the movement of an object, for example, in three dimensions. This is even likely to be the case in most circumstances. An accelerometer may be placed so that it is positioned along the most likely axis of movement, but a user will invariably trip multiple accelerometers in most natural hand motions. Individual measurement thresholds may be used for each sensor to determine what standardized output is to be used from each sensor in the navigation calculations. As seen in the stopping motion of FIG. 5, the measurements from multiple sensors 508 may be combined such as to form a vector sum of the measurement data. In this manner the resulting vector sum may be compared to a threshold to determine the sensor data to be used in the navigation calculations.

Figure 6:
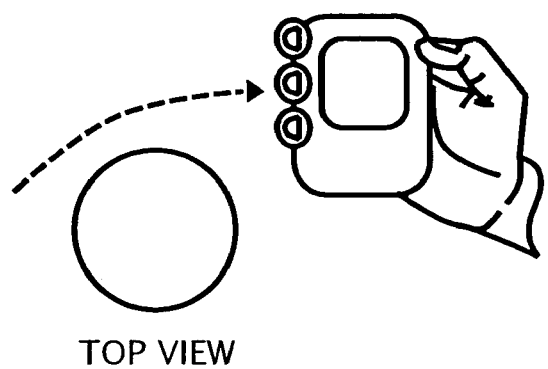
FIG. 6 shows a top view of how a person trying to move a hand held display in a straight line naturally moves the display in an arc.

FIG. 6 shows a top view of a person moving a display from left to right. Although the intent of the movement is a straight line, the actual movement travels in a slight arc. In one embodiment of this invention, the display device is programmed so that it registers only movement for a natural range of human motion. Such programming can help in setting the threshold levels, as movements in the horizontal are different than those in the vertical, and stopping motions are different than starting motions, and so forth. Even the case where humans tend to move the device in an arc rather than a straight line, can be compensated for so that the arc motion gets translated to a straight line motion effect.

Taking into account that human users are of limited dimension, i.e. size, threshold navigation is used to measure and compute the movements of an object within a limited volume of three-dimensional space. A specific example of this embodiment is the determination of movements of a device or appliance that is held in the hand or worn on the body of a user. The virtue of applying threshold navigation to a hand-held or body-worn object is that the range of potential movements of the user's body limits the volume of three-dimensional space comprising the potential range of the object's motion. Also, the duration of the movement is finite. Both of these restrictions can be used in setting the parameters of calculating threshold navigation.

In a further preferred embodiment, the threshold navigation has an off/on function that can deactivate the accelerometer measurements and, preferably, reset all movement to zero. The effect would be negating all distance mapped from the velocity vectors. This switch could, for example, be a thumb switch on the side of a hand held display. The need to temporarily deactivate the accelerometers from moving the display can be for a variety of reasons. It is desirable, however, to be able to easily stop the system. Resetting all distance and/or velocity to zero is useful in standard applications already discussed, but can also be of utility when traveling in a moving vehicle or when the system has a false reading. Another preferred embodiment involves a different type of resets in which the display itself is reset to its original location. These different types of reset may be used in conjunction or stand alone.

Figure 7:
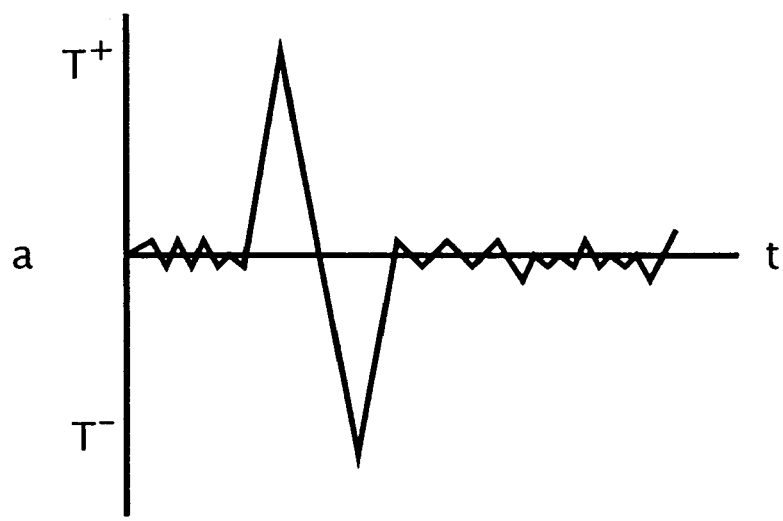
FIG. 7 graphically illustrates an unintentional negative acceleration immediately after a strong starting acceleration.

One embodiment not shown, is when multiple or significant negative thresholds are crossed and produce a negative velocity, which produces a backwards tracking. This feature is preferably not used in conjunction with the "Disable period" discussed below. Preferred embodiments of the threshold comparison and velocity decision process may include a "No stopping allowed" period after a starting, which may depend on the starting speed. Reasons for these features are that a large acceleration output should result in a high velocity that correlates to large movements of the object, whereas a small acceleration results in a small velocity corresponding to very small movements. In other words, a user could, in a small period of time, jerk their hand to start navigating, realize that they have jerked too hard, and adjust their pull to the desired speed. This, however, could look like a deceleration to the navigation system. FIG. 7 illustrates one example of this on an acceleration plot. The initial hand jerk greatly crosses the T+threshold, but since, in this case, there is only one positive threshold level, the correction in hand motion produces a negative acceleration that crosses the stopping threshold T−, and would produce a stop. However, with the "No stopping allowed" period after start, a user can adjust their hand speed without accidentally stopping the movement command.

Figure 8:
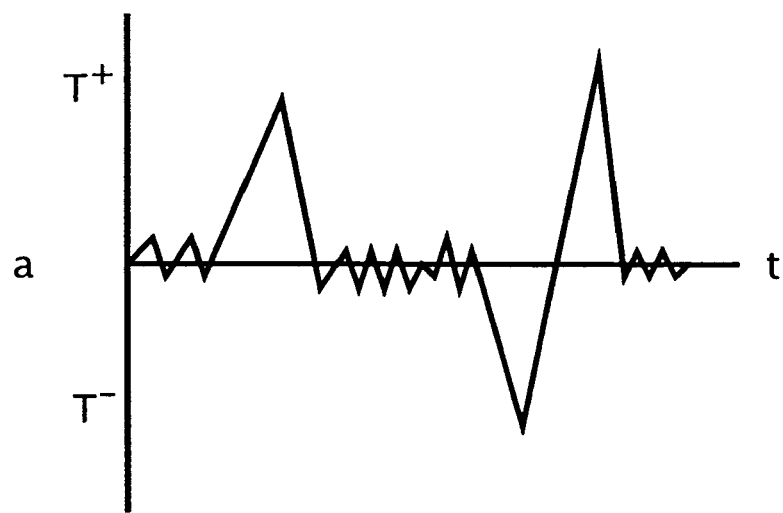
FIG. 8 graphically illustrates an unintentional positive acceleration immediately after a stop.

A similar embodiment to the "No stopping allowed" period after start, is a "Disabled period" after a stop. Once a user stops the navigating motion, the desire to tilt or adjust the display could create a new acceleration reading, and thus start the navigating of the display once again. FIG. 8 illustrates on an acceleration plot how this might be implemented. This disable feature is particularly desired by a novice who might accelerate backwards instead of stopping smoothly. Therefore, in order to avoid frustration in having the display continue to scroll when a stop is desired, a "Disabled period" after stop can be a desired preferred embodiment.

Both of the just mentioned preferred embodiments fall under the premise that a measured acceleration or deceleration that is greater than a threshold may be closely associated in time with other acceleration or deceleration data from the sensor that is likely the result of sensor noise, overshoot, or other sensor error. Two measurements read at points close in time may be sensor noise, over shoot, another form of error. It is also important to note that a natural change in the velocity of an object is not typically an abrupt change.

What is claimed is:

1. A threshold navigation system comprising:
   a device including a display screen in a device housing;
   one or more sensors measuring movement of said device, said one or more sensors disposed in said device housing;
   wherein said one or more sensors register movement when a threshold level of activation motion is reached;
   wherein said registering of movement is translated into a movement vector;
   wherein said movement vector is being used to change contents of the display screen in a manner related to said movement vector; and
   wherein a second movement in a direction substantially opposite of said movement is translated into a stop vector, wherein said stop vector stops said movement vector.

2. A system for converting real movement into a movement vector comprising:
- a device capable of being moved comprising a display screen in a device housing;
- said device containing one or more sensors capable of sensing activation motion of said device when said device is moved, said one or more sensors located in said device housing;
- wherein said sensors produce said movement vector related to said activation motion of said device when said activation motion produces an acceleration that is above a threshold level, said movement vector being at a predetermined level;
- wherein activation motion below said threshold level does not produce a movement vector; and
- wherein a plurality of said sensors are used to sense said motion, and a total activation motion measurement is averaged between said sensors before comparing said activation motion to said threshold level.

3. A system for converting real movement into a movement vector comprising:
- a device capable of being moved comprising a display screen in a device housing; and
- said device containing one or more sensors capable of sensing activation motion of said device when said device is moved, said one or more sensors located in said device housing;
- wherein said sensors produce said movement vector related to said activation motion of said device when said activation motion produces an acceleration that is above a threshold level, said movement vector being at a predetermined level;
- wherein activation motion below said threshold level does not produce a movement vector; and
- wherein a second threshold level produces a second movement vector.

4. A system for converting real movement into a movement vector comprising:
- a device capable of being moved comprising a display screen in a device housing;
- said device containing one or more sensors capable of sensing activation motion of said device when said device is moved, said one or more sensors located in said device housing;
- wherein said sensors produce said movement vector related to said activation motion of said device when said activation motion produces an acceleration that is above a threshold level, said movement vector being at a predetermined level;
- wherein activation motion below said threshold level does not produce a movement vector;
- wherein a plurality of said sensors are used to sense said motion, and a total activation motion measurement is averaged between said sensors before comparing said activation motion to said threshold level; and
- wherein said first threshold level does not produce said movement vector when a second threshold level produces a second movement vector.

5. A system for converting real movement into a movement vector comprising:
- a device capable of being moved comprising a display screen in a device housing;
- said device containing one or more sensors capable of sensing activation motion of said device when said device is moved, said one or more sensors located in said device housing;
- wherein said sensors produce said movement vector related to said activation motion of said device only when said activation motion produces an acceleration that is above a threshold level, said movement vector being at a predetermined level;
- wherein activation motion below said threshold level does not produce a movement vector;
- wherein a plurality of said sensors are used to sense said motion, and a total activation motion measurement is averaged between said sensors before comparing said activation motion to said threshold level; and
- wherein said first threshold level will only produce a movement vector once.

6. A system for converting real movement into a movement vector comprising:
- a device capable of being moved comprising a display screen in a device housing;
- said device containing one or more sensors capable of sensing activation motion of said device when said device is moved, said one or more sensors located in said device housing;
- wherein said sensors produce said movement vector related to said activation motion of said device only when said activation motion produces an acceleration that is above a threshold level, said movement vector being at a predetermined level;
- wherein activation motion below said threshold level does not produce a movement vector;
- wherein a plurality of said sensors are used to sense said motion, and a total activation motion measurement is averaged between said sensors before comparing said activation motion to said threshold level; and
- wherein a second movement vector is a negative movement vector as compared to said movement vector.

7. A system for converting real movement into a movement vector comprising:
- a device capable of being moved comprising a display screen in a device housing;
- said device containing one or more sensors capable of sensing activation motion of said device when said device is moved, said one or more sensors located in said device housing;
- wherein said sensors produce said movement vector related to said activation motion of said device only when said activation motion produces an acceleration that is above a threshold level, said movement vector being at a predetermined level;
- wherein activation motion below said threshold level does not produce a movement vector;
- wherein a plurality of threshold levels are used to produce a plurality of movement vectors; and
- wherein only a greatest of said threshold levels crossed produces said movement vector.

8. A system for converting real movement into a movement vector comprising:
- a device capable of being moved comprising a display screen in a device housing;
- said device containing one or more sensors capable of sensing activation motion of said device when said device is moved, said one or more sensors located in said device housing;
- wherein said sensors produce said movement vector related to said activation motion of said device only when said activation motion produces an acceleration that is above a threshold level, said movement vector being at a predetermined level;

wherein activation motion below said threshold level does not produce a movement vector;

wherein a plurality of threshold levels are used to produce a plurality of movement vectors; and wherein a stop vector is created when a given threshold level opposite in sign to the threshold level that produced said movement vector is crossed;

said stop vector being assigned an activation motion opposite to the direction of motion that created said movement vector, wherein said stop vector stops said movement vector;

said given threshold level for said stop vector being approximately equal to or less than said threshold level for said movement vector;

wherein said stop vector is produced for each said movement vector produced and wherein said stop vector is reset when said stop movement vector is stopped.

9. A system for converting real movement into a movement vector comprising:

a device capable of being moved comprising a display screen in a device housing;

said device containing one or more sensors capable of sensing activation motion of said device when said device is moved, said one or more sensors located in said device housing;

wherein said sensors produce said movement vector related to said activation motion of said device only when said activation motion produces an acceleration that is above a threshold level, said movement vector being at a predetermined level;

wherein activation motion below said threshold level does not produce a movement vector;

wherein a stop vector is created when a given threshold level opposite in sign to the threshold level that produced said movement vector is crossed;

said stop vector being assigned an activation motion opposite to the direction of motion that created said movement vector, wherein said stop vector stops said movement vector;

said threshold for said stop vector being approximately equal to or less than said threshold level for said movement vector;

wherein said stop vector is produced for each said movement vector produced and wherein said stop vector is reset when said stop movement vector is stopped.

10. A system for convening real movement into a movement vector comprising:

a device capable of being moved comprising a display screen in a device housing;

said device containing one or more sensors capable of sensing activation motion of said device when said device is moved, said one or more sensors located in said device housing;

wherein said sensors produce said movement vector related to said activation motion of said device only when said activation motion produces an acceleration that is above a threshold level, said movement vector being at a predetermined level;

wherein activation motion below said threshold level does not produce a movement vector;

wherein a stop vector is created when a given threshold level opposite in sign to the threshold level that produced said movement vector is crossed;

said stop vector being assigned an activation motion opposite to the direction of motion that created said movement vector, wherein said stop vector stops said movement vector;

said threshold for said stop vector being approximately equal to or less than said threshold level for said movement vector;

wherein said stop vector is produced for each said movement vector produced and wherein said stop vector is reset when said stop movement vector is stopped; and wherein said stop vector acts as a stop for all movement vectors activated in a direction opposite that of said stop vector.

11. A system for converting real movement into a movement vector comprising:

a device capable of being moved comprising a display screen in a device housing;

said device containing one or more sensors capable of sensing activation motion of said device when said device is moved, said one or more sensors located in said device housing;

wherein said sensors produce said movement vector related to said activation motion of said device only when said activation motion produces an acceleration that is above a threshold level, said movement vector being at a predetermined level;

wherein activation motion below said threshold level does not produce a movement vector;

wherein a stop vector is created when a given threshold level opposite in sign to the threshold level that produced said movement vector is crossed;

said stop vector being assigned an activation motion opposite to the direction of motion that created said movement vector, wherein said stop vector stops said movement vector;

said threshold for said stop vector being approximately equal to or less than said threshold level for said movement vector;

wherein said stop vector is produced for each said movement vector produced and wherein said stop vector is reset when said stop movement vector is stopped; and wherein said stop vector can be produced by an override command to said device or sensors.

12. A system for converting real movement into a movement vector comprising:

a device capable of being moved comprising a display screen in a device housing;

said device containing one or more sensors capable of sensing activation motion of said device when said device is moved, said one or more sensors located in said device housing;

wherein said sensors produce said movement vector related to said activation motion of said device only when said activation motion produces an acceleration that is above a threshold level, said movement vector being at a predetermined level;

wherein activation motion below said threshold level does not produce a movement vector;

wherein a stop vector is created when a given threshold level opposite in sign to the threshold level that produced said movement vector is crossed;

said stop vector being assigned an activation motion opposite to the direction of motion that created said movement vector, wherein said stop vector stops said movement vector;

said threshold for said stop vector being approximately equal to or less than said threshold level for said movement vector;

wherein said stop vector is produced for each said movement vector produced and wherein said stop vector is reset when said stop movement vector is stopped; and wherein said stop vector has multiple threshold levels, wherein a threshold level corresponds to one or more of said movement vectors.

13. A system for converting real movement into a movement vector comprising:
a device capable of being moved comprising a display screen in a device housing;
said device containing one or more sensors capable of sensing activation motion of said device when said device is moved, said one or more sensors located in said device housing;
wherein said sensors produce said movement vector related to said activation motion of said device only when said activation motion produces an acceleration that is above a threshold level, said movement vector being at a predetermined level;
wherein activation motion below said threshold level does not produce a movement vector;
wherein a stop vector is created when a given threshold level opposite in sign to the threshold level that produced said movement vector is crossed;
said stop vector being assigned an activation motion opposite to the direction of motion tat created said movement vector, wherein said stop vector stops said movement vector;
said threshold for said stop vector being approximately equal to or less than said threshold level for said movement vector;
wherein said stop vector is produced for each said movement vector produced and wherein said stop vector is reset when said stop movement vector is stopped;
wherein said stop vector has multiple threshold levels, wherein a threshold level corresponds to one or more of said movement vectors; and
wherein a maximum threshold of the multiple threshold levels produces a new movement vector in the opposite direction of said movement vector.

14. A threshold navigation system comprising:
a device capable of being moved comprising a display screen in a device housing; and one or more sensors measuring movement of said device, said one or more sensors located in said device housing;
wherein said one or more sensors register movement only when a threshold level of motion is reached;
wherein said registering of movement is ten being translated into a movement vector;
wherein said movement vector is being used to change contents of a display screen in a manner related to said movement vector;
wherein said device is at least one of hand held and worn by a user; and wherein,
a natural arc produced by natural movement of human anatomy is calibrated to be translated as a straight movement.

15. A navigation system for using movement of a device to adjust content displayed in a display screen of the device, the navigation system, comprising:
a device housing of the device; and
one or more sensors coupled to the device that measure movement of said device;
said one or more sensors translates the movement into a movement vector in response to detecting tat acceleration of an activation motion reaches or exceeds a threshold level;
wherein the content displayed in the display screen is adjusted in a manner related to said movement vector;

wherein a second movement in a direction substantially opposite of said movement is translated into a stop vector, wherein said stop vector stops said movement vector.

16. A system for converting physical movement into a movement vector, the system, comprising:
a device having a display screen and a device housing;
a plurality of sensors coupled to the device, the sensors operable to detect movement of said device;
in response to the sensors detecting that acceleration of said movement of said device reaches or exceeds a threshold level, said sensors generate said movement vector based on said movement of said device;
wherein the sensors do not generate a movement vector if the movement of the device has an acceleration below said threshold level;
wherein a cumulative movement measurement is obtained by averaging the measurements obtained from each of said plurality of sensors for comparison with said threshold level.

17. A system for converting physical movement into a movement vector, the system, comprising:
a device having a display screen and a device housing;
a sensor coupled to the device, the sensor operable to detect movement of said device;
in response to the sensor detecting that acceleration of said movement of said device reaches or exceeds a threshold level, said sensor generates said movement vector based on said movement of said device;
wherein the sensor does not generate a movement vector if the movement of the device has an acceleration below said threshold level;
in response to the sensor detecting that acceleration of said movement of said device reaches or exceeds a second threshold level, the sensor generates a second movement vector;
wherein said threshold level is not used to generate said movement vector when the second threshold level is used to generate the second movement vector.

18. A system for converting physical movement into a movement vector, the system, comprising:
a device having a display screen and a device housing;
a sensor coupled to the device, the sensor operable to detect movement of said device;
in response to the sensor detecting that acceleration of said movement of said device reaches or exceeds a threshold level, said sensor generates said movement vector based on said movement of said device;
wherein the sensor does not generate a movement vector if the movement of the device has an acceleration below said threshold level;
wherein a plurality of threshold levels are used for generating a plurality of movement vectors;
wherein a stop vector is created when a given threshold level opposite in sign to the threshold level that produced said movement vector is crossed;
said stop vector being assigned a motion of the device that is opposite to the direction of the movement used to create said movement vector, wherein said stop vector stops said movement vector;
said given threshold level for said stop vector being approximately equal to or less than said threshold level for said movement vector;
wherein said stop vector is produced for each said movement vector produced and wherein said stop vector is reset when said stop movement vector is stopped.

19. A system for converting physical movement into a movement vector, the system, comprising:
- a device having a display screen and a device housing;
- a sensor coupled to the device, the sensor operable to detect movement of said device;
- in response to the sensor detecting that acceleration of said movement of said device reaches or exceeds a threshold level, said sensor generates said movement vector based on said movement of said device;
- wherein the sensor does not generate a movement vector if the movement of the device has an acceleration below said threshold level;
- wherein a stop vector is created when a given threshold level opposite in sign to the threshold level that produced said movement vector is crossed;
- said stop vector being assigned a motion opposite to the direction of the movement used to create said movement vector, wherein said stop vector stops said movement vector;
- said given threshold for said stop vector being approximately equal to or less than said threshold level for said movement vector;
- wherein said stop vector is produced for each said movement vector produced and wherein said stop vector is reset when said stop movement vector is stopped.

20. The system in claim 19, wherein said stop vector acts as a stop for all movement vectors activated in a direction opposite that of said stop vector.

21. The system in claim 19, wherein said stop vector can be produced by an override command to said device or the sensor.

22. The system in claim 19, wherein said stop vector has multiple threshold levels, wherein a threshold level corresponds to one or more of said movement vectors.

23. The system in claim 22, wherein a maximum threshold of the multiple threshold levels produces a new movement vector in the opposite direction of said movement vector.

24. A navigation system for using movement of a hand-held device to adjust content displayed in a display screen of the device, the navigation system, comprising:
- a device housing of the hand-held device; and
- a sensor coupled to the hand-held device to measure movement of said hand-held device;
- the movement being translated into a movement vector when a threshold level of the movement is reached;
- wherein the content displayed in the display screen is adjusted in a manner related to said movement vector;
- wherein, the sensor is able to be de-activated such that the movement of the hand-held device is not detected or measured;
- wherein, a natural arc produced by natural movement of human anatomy is calibrated to be translated as a straight movement.

* * * * *

UNITED STATES PATENT AND TRADEMARK OFFICE
CERTIFICATE OF CORRECTION

PATENT NO.      : 7,647,175 B2
APPLICATION NO. : 11/223434
DATED           : January 12, 2010
INVENTOR(S)     : Sina Fateh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 543 days.

Signed and Sealed this

Sixteenth Day of November, 2010

David J. Kappos
*Director of the United States Patent and Trademark Office*